UNITED STATES PATENT OFFICE.

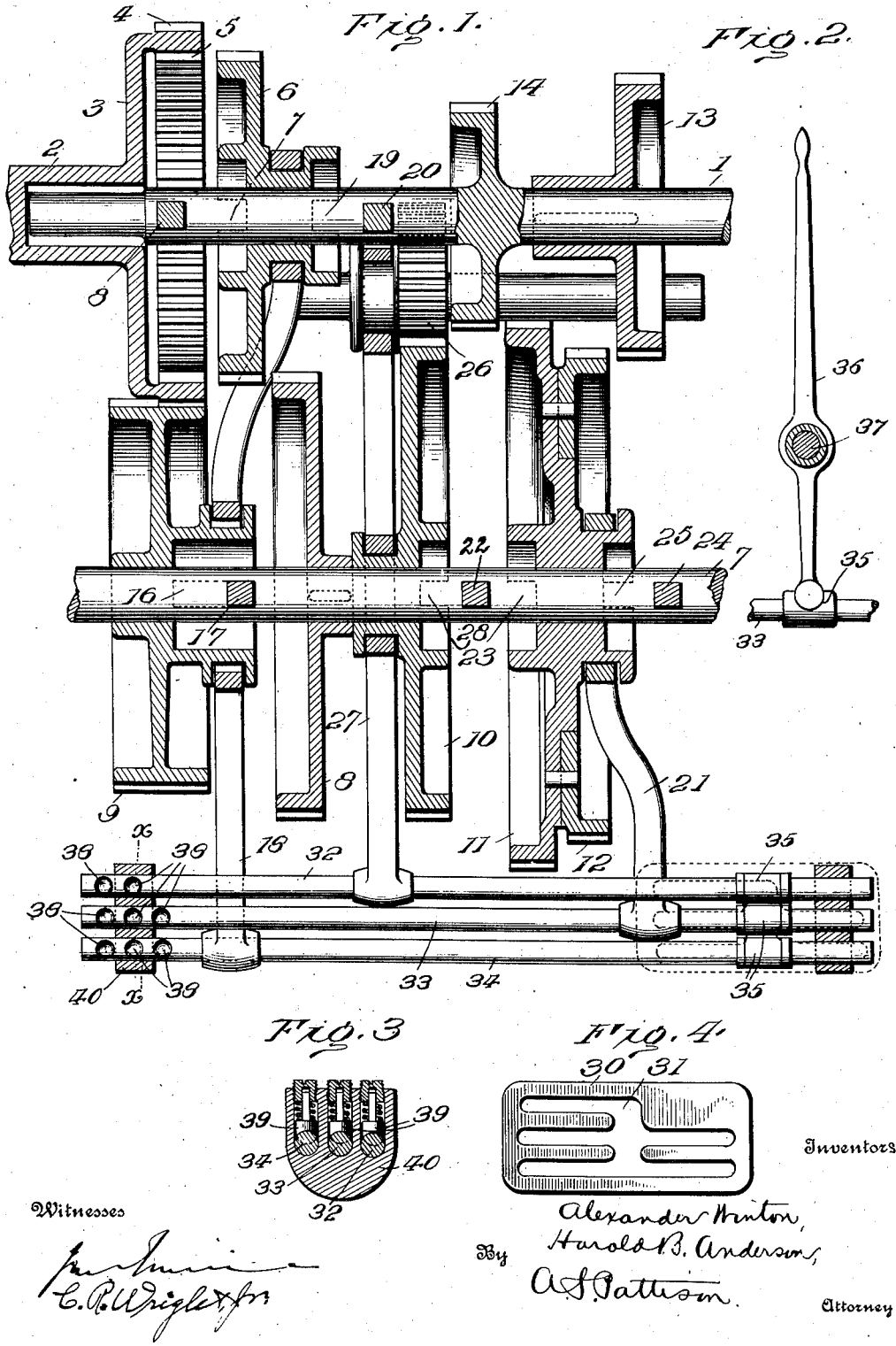

ALEXANDER WINTON AND HAROLD B. ANDERSON, OF CLEVELAND, OHIO, ASSIGNORS TO THE WINTON MOTOR CARRIAGE COMPANY, OF CLEVELAND, OHIO, A CORPORATION OF OHIO.

SLIDING-GEAR TRANSMISSION MECHANISM.

990,618.  Specification of Letters Patent.  Patented Apr. 25, 1911.

Application filed April 21, 1906. Serial No. 313,030.

*To all whom it may concern:*

Be it known that we, ALEXANDER WINTON and HAROLD B. ANDERSON, citizens of the United States, residing at Cleveland, in the county of Cuyahoga and State of Ohio, have invented certain new and useful Improvements in Sliding-Gear Transmission Mechanism, of which the following is a specification, reference being had therein to the accompanying drawing.

This invention relates to improvements in sliding gear transmission mechanism, and is of the "selective type."

The primary object of this invention is to so combine a positive clutch with sliding gears that the gears are brought into mesh before they are connected with the shaft upon which they are placed, which reduces the shock upon engagement of the gear teeth to a minimum, and prevents the chattering noise common to sliding gear transmission mechanisms when bringing the gears into mesh, and also prevents stripping the gears which frequently occurs where the teeth are subjected to the shock of engagement while locked to their shafts.

Another object of the present invention is to so arrange and combine the gears that when driving direct from the power shaft, none of the gears of the mechanism are in mesh.

In the accompanying drawings, Figure 1 is a sectional view of our improved sliding gear transmission mechanism. Fig. 2 is a detached view showing the controlling lever in contact with one of the recessed members 35. Fig. 3 is a transverse section on the line *x*—*x*, of Fig. 1. Fig. 4 is a plan view of the guide plate for shifting the controller lever.

The mechanism herein shown is a transmission mechanism for automobiles, in which 1 is the driving shaft, and 2 the driven shaft. Shaft 2 is to be connected in any desired or suitable manner with the driving wheels (not shown) of the automobile. Firmly connected with the shaft 2 is a gear 3 having external gear teeth 4 and internal teeth 5. Located upon the shaft 1 adjacent the gear 3 is a sliding gear 6 which is loose upon said shaft when in the position shown in Fig. 1. One side of the hub of this gear 6, is provided with slots 7 adapted to receive the pin 8 which projects from the driving shaft 1, and when so engaged locks the gear to its shaft 1. The opposite end of the hub of gear 6 is provided with a slot 19, which is adapted to receive the pin 20 of the shaft 1, and locks the gear to said shaft.

The gear 6 fits within the gear 3 when moved to the left of Fig. 1, and attention is especially directed to the fact that the gear 6 is nearer to the internal teeth 5 of the gear 3 than the distance between the pin 8 and the engaging portion of the hub of the gear 6. Owing to this arrangement, the gear 6 is in engagement with the teeth 5 in advance of the locking or clutching of the gear 6 to its shaft 1 by engaging the pin 8. From this it follows that when the gear 6 is brought into engagement with the teeth 5, the driving shaft 2 and gear 6 are revolving independently of the shaft 1, and this in turn prevents the shock to the engaging teeth that would occur if the gear 6 was locked to its shaft at the time of engagement.

All the sliding gears of our mechanism are arranged to be loose on their shafts at the time they engage the teeth of their coacting or intermeshing gears with the consequent result above mentioned.

The hub of the sliding gear 9 is provided with an elongated slot 16, which receives the pin 17, and thereby the gear 9 is, at all times, rotatably locked to its shaft 7. A slot 28 is formed in the hub of wheel 8, and this slot receives the pin 22 of shaft 7 when the gear is shifted to the right, which rotatably locks the said gear to its shaft, and the adjacent end of the hub of the sliding gear 11 is provided with a slot 23, adapted also to receive the pin 20 for locking the gear to its shaft. The opposite end of the hub or gear 11 has a slot which is adapted to receive the pin 24 of the shaft 7 to lock the gear to the shaft when the pin 24 is in the slot 25. Yokes 18, 21 and 27 shift the said sliding gears in the manner hereinafter described, and these yokes are connected respectively to the sliding rods 32, 33 and 34, to be more fully described hereinafter.

We will now proceed to describe the arrangement of the gears, and their coöperation. The mechanism includes a countershaft 7 to which is firmly attached a gear 8, and upon which are mounted the sliding gears 9, 10, 11 and 12. The two latter gears are attached together. Firmly attached to the shaft 1 are the gears 14 and 13, while the gear 6 slides thereon.

Referring now to the operation of this mechanism, when the gear 6 is moved to operative engagement with the teeth 5 and pin 8 by the yoke arm 18, the gear 9 has its hub slot 16 carried out of engagement with the pin 17, which unlocks it from the counter-shaft 7. All the other gears of the mechanism are out of mesh, and the shaft 1 is locked directly to the shaft 2 by the gear 6. The engine is then driving direct and the fourth and high speed is in operation without any gears of the mechanism being in mesh.

For the third speed, the gears 6 and 9 are moved to the right which carries the gear 6 into mesh with the gear 8, which is fast upon the counter-shaft 7. While the gear 6 is moved into mesh with the gear 8, the gear 6 is loose on the driving shaft 1, but the farther movement of the gear 6 carries its hub slot 19 into engagement with the transverse pin 20 and locks said gear 6 to the shaft 1 after the engagement or mesh is effected, which, as previously stated, prevents the usual shock and sudden strain on the teeth of the gears by reason of the fact that gear 6 is loose on its shaft at the moment of engagement with the gear 8. The teeth of the gear 9 are sufficiently long to be in engagement with the gear 3 when the parts are in the position shown in Fig. 1, and also when the gear is moved to the right for the third speed, as just described. When the gear 6 is in mesh with the gear 8 on the counter-shaft as just set forth, power is transmitted from the engine shaft 1 through the gear 6, and gear 8 to the counter-shaft, and gear 9, to the gear 4 on the shaft 2.

A second speed is obtained by moving gear 11 of the counter-shaft into mesh with the gear 14 on the shaft 1, and the lower or first speed is obtained by moving the gear 12 of the counter-shaft into mesh with the gear 13 on the driving shaft. As previously stated, gears 11 and 12 are attached and move together for convenience in construction and operation, and these gears are moved by a suitable yoke-arm 21. Extending from the counter-shaft is the transverse pin 22 with which the hub-slot 23 engages after the gear 11 is in mesh with the gear 14, and a transverse pin 24 extends from the counter-shaft at the opposite end of the hub of the gears 11 and 12, with which pin the hub-slot 25 engages after the gear 12 is in mesh with the gear 13 of the shaft 1.

The reverse motion for the driven shaft 2 is obtained by the gear 10 and idler 26, both of which are moved simultaneously by the yoke-arm 27 to carry the idler into mesh with the gear 14 on the driving shaft. When the gear 10 is moved to the right the idler is caused to mesh with the gear 14 before the hub-slot 28 of the gear 10 is in engagement with the transverse pin 22 for the purpose already explained. From the foregoing it will be observed that when the parts are in their normal position shown in Fig. 1, the engine shaft or motive power is out of operative connection with the driven shaft 2 and that the gears 3 and 9 are the only gears in mesh.

A plate 30 is provided with a plurality of slots for the gear-controlling member, whereby the slot determines the particular gear in mesh or operation. The slots are arranged to extend from a central slot 31, so that to change gears it is necessary to move the controller lever 36 to the center slot before it can be placed in either of the other slots. This arrangement insures that one set of gears must be thrown out of mesh or into a neutral position before another set can be put in mesh for a change of speed.

We desire it understood that the third speed could be the direct speed, and the high or fourth speed indirect, by making the gear 9 of the counter-shaft of larger diameter than the gear 3 of the engine shaft, without departing from the spirit or scope of our inevention.

The means here shown of operating the selective system consists in providing the sliding members or rods 32, 33, and 34. The arm 18 is connected with the member 34; the arm 21 with the member 33, and the arm 27 with the member 32. Each of the said sliding members is provided with a recessed portion 35, and when the members are in the neutral position shown in Fig. 1, these recessed portions are in a line. Positioned over and extending in a direction transverse to the members 32, 33 and 34, is a shaft or rod 37, and slidably and pivotally supported on this rod is a lever 36. By means of this arrangement, the lever 36 can be moved laterally to enter either of the slots of the plate 30, and when so moved will engage the recessed portion 35 of the desired sliding member, as will be readily understood. By swinging the lever on the shaft 37 in the proper direction the desired gear is brought into action.

For the purpose of holding the respective rods in the position to which they are moved, the sliding members are provided with recesses 38, with which spring detents 39 engage, and these detents are carried by a suitable member 40. The detents and recesses are of such shape as to permit them to slide out of engagement by endwise pressure on the members through the lever 36.

Having thus described our invention, what we claim and desire to secure by Letters Patent is:

1. A sliding gear transmission mechanism including a driven shaft 2, a gear fast thereto, a counter-shaft, a sliding gear fast to said counter-shaft and in mesh with said driven shaft gear, a driving shaft 1, variable speed transmission gears carried by said driving and counter-shafts, one of the driving shaft gears being loose thereon and adapted to be locked to the driving and driven shafts when moved in one direction, and to mesh with one of the counter-shaft speed gears and locked to its own shaft when moved in the other direction, and operating means to move the said counter and driving shaft gears into engagement, the parts operating as and for the purpose described.

2. A sliding gear transmission mechanism including a driven shaft 2, a gear fast thereon, a counter-shaft, a gear on the counter-shaft and in mesh with said driven shaft gear, a driving shaft 1, variable speed gears on said driving shaft, loose sliding gears on the counter-shaft, and positive locking means between the loose sliding gears and their shaft so located that the locking takes place after the meshing of the gears for the purpose described.

In testimony whereof we affix our signatures in presence of two witnesses.

ALEXANDER WINTON.
HAROLD B. ANDERSON.

Witnesses:
O. F. BAUGHMAN,
A. S. NEWTON.